United States Patent
Gaither et al.

(10) Patent No.: US 10,816,975 B2
(45) Date of Patent: Oct. 27, 2020

(54) AUTONOMOUS ACCELERATION PROFILE FEEDBACK SYSTEM

(71) Applicant: Toyota Motor Engineering & Manufacturing North America, Inc., Erlanger, KY (US)

(72) Inventors: Geoffrey D. Gaither, Brighton, MI (US); Nathan C. Westover, New Hudson, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 425 days.

(21) Appl. No.: 15/673,304

(22) Filed: Aug. 9, 2017

(65) Prior Publication Data
US 2019/0049959 A1 Feb. 14, 2019

(51) Int. Cl.
*G05D 1/00* (2006.01)
*B60K 31/00* (2006.01)
(Continued)

(52) U.S. Cl.
CPC ........... *G05D 1/0088* (2013.01); *B60K 31/00* (2013.01); *B60W 30/00* (2013.01); *G05D 1/0221* (2013.01);
(Continued)

(58) Field of Classification Search
None
See application file for complete search history.

(56) References Cited

U.S. PATENT DOCUMENTS 8,634,822 B2 * 1/2014 Silver ..................... G06F 16/90
455/420
8,635,018 B2 * 1/2014 Chia ...................... G07C 5/008
701/25
(Continued)

FOREIGN PATENT DOCUMENTS

WO WO2016109540 7/2016

OTHER PUBLICATIONS

Le Vine et al.; "*Autonomous cars: The tension between occupant experience and intersection capacity*"; Transportation Research Part C (2015) 1-14; (14 pages).
(Continued)

*Primary Examiner* — Nicholas Kiswanto
(74) *Attorney, Agent, or Firm* — Snell & Wilmer LLP (57) ABSTRACT

A system for adjusting acceleration of a vehicle based on user preference includes a memory designed to store first and second base vehicle acceleration modes each corresponding to a different pre-selected acceleration profile of the vehicle, and a power source for generating power. The system also includes an input device designed to receive a selected base acceleration mode and a user acceleration adjustment indicating a desired adjustment to the selected base acceleration mode. The system also includes an ECU designed to control the power source to accelerate the vehicle using the selected base acceleration mode during an initial trip of the vehicle, create a first user acceleration profile that corresponds to the desired adjustment to the selected base acceleration mode when the user acceleration adjustment is received, and control the power source to accelerate the vehicle using the first user acceleration profile during a second trip of the vehicle.

20 Claims, 6 Drawing Sheets

(51) Int. Cl.
*G05D 1/02* (2020.01)
*G08G 1/01* (2006.01)
*B60W 30/00* (2006.01)
*B60W 30/18* (2012.01)

(52) U.S. Cl.
CPC ..... *G08G 1/0129* (2013.01); *B60W 30/18009* (2013.01); *B60W 2720/103* (2013.01); *G05D 2201/0213* (2013.01)

(56) References Cited

U.S. PATENT DOCUMENTS

| | | | |
|---|---|---|---|
| 8,849,494 | B1 | 9/2014 | Herbach et al. |
| 8,948,955 | B2 | 2/2015 | Zhu et al. |
| 8,965,621 | B1 | 2/2015 | Urmson et al. |
| 9,199,667 | B2 | 12/2015 | Di Cairano et al. |
| 9,358,940 | B2 | 7/2016 | Cooper et al. |
| 9,476,369 | B2 * | 10/2016 | Gregg .................... F02D 28/00 |
| 9,499,175 | B2 | 11/2016 | Tuukkanen |
| 9,517,771 | B2 * | 12/2016 | Attard ............ B60W 30/18163 |
| 10,077,056 | B1 * | 9/2018 | Fields .................... G06Q 40/08 |
| 10,112,611 | B2 * | 10/2018 | McNew ............. B60W 30/162 |
| 10,203,031 | B2 * | 2/2019 | Gauthier ............. F16H 61/0213 |
| 10,449,957 | B2 * | 10/2019 | Nagy .................... B60W 30/14 |
| 2007/0143482 | A1 * | 6/2007 | Zancho ................. H04L 67/306 709/227 |
| 2012/0271500 | A1 * | 10/2012 | Tsimhoni ................. B62D 1/28 701/23 |
| 2012/0296492 | A1 * | 11/2012 | Gusikhin .............. B60R 16/037 701/1 |
| 2015/0081362 | A1 | 3/2015 | Chadwick et al. |
| 2015/0149017 | A1 * | 5/2015 | Attard ................. B60W 30/182 701/23 |
| 2015/0249906 | A1 | 9/2015 | Thomas et al. |
| 2016/0026182 | A1 | 1/2016 | Boroditsky et al. |
| 2016/0375768 | A1 | 12/2016 | Konet et al. |
| 2017/0015318 | A1 * | 1/2017 | Scofield ................. H04W 12/08 |
| 2017/0123423 | A1 * | 5/2017 | Sako ................. G01C 21/3407 |
| 2017/0297586 | A1 * | 10/2017 | Li ......................... G05D 1/0221 |
| 2018/0148036 | A1 * | 5/2018 | Gaither ................. B60W 20/12 |
| 2019/0049981 | A1 * | 2/2019 | Fischer .................. G05D 1/024 |

OTHER PUBLICATIONS

Elbanhawi et al; "*In the Passenger Seat: Investigating Ride Comfort Measures in Autonomous Cars*"; School of Aerospace, Mechanical and Manufacturing Engineering (SAMME) RMIT University, Melbourne, Australia; (13 pages).

* cited by examiner

| IDENTIFIER | 1ST USER ACCEL PROFILE | 2ND USER ACCEL PROFILE | COMBINED USER ACCEL PROFILE | MERGED USER ACCEL PROFILE |
|---|---|---|---|---|
| ACCEL FROM STOP | 10 M/S2 | 5 M/S2 | 10 M/S2 | 7.5 M/S2 |
| ACCEL ON ON-RAMP | 15 M/S2 | 10 M/S2 | 10 M/S2 | 12.5 M/S2 |
| ACCEL ON CITY ROAD | 5 M/S2 | 5 M/S2 | 5 M/S2 | 5 M/S2 |
| ACCEL ON HIGHWAY | 15 M/S2 | 10 M/S2 | 10 M/S2 | 12.5 M/S2 |
| DECEL TO STOP | 10 M/S2 | 5 M/S2 | 10 M/S2 | 7.5 M/S2 |
| DECEL ON OFF-RAMP | 10 M/S2 | 5 M/S2 | 5 M/S2 | 7.5 M/S2 |
| DECEL ON CITY ROAD | 5 M/S2 | 5 M/S2 | 5 M/S2 | 5 M/S2 |
| DECEL ON HIGHWAY | 15 M/S2 | 10 M/S2 | 10 M/S2 | 12.5 M/S2 |
| RELATIVE SPEED | +9 MPH | -2 MPH | +3 MPH | +3 MPH |
| RIDE STIFFNESS | 7/10 | 3/10 | 3/10 | 5/10 |
| FOLLOWING DISTANCE | 30 YARDS | 50 YARDS | 50 YARDS | 40 YARDS |
| AUDIO SETTINGS | CLASSIC ROCK, VOL 30 | JAZZ, VOL 15 | CLASSICAL, VOL 20 | N/A |
| CLIMATE CONTROL | 67 F | 74 F | 74 F | 70.5 F |
| G TURN FORCE | 2G | 1G | 1G | 1.5G |

AUTONOMOUS ACCELERATION PROFILE FEEDBACK SYSTEM

BACKGROUND

1. Field

The present disclosure relates to systems and methods for controlling vehicles to accelerate using a user preferred acceleration profile and, more particularly, to systems and methods for adjusting accelerations of autonomous vehicles based on user-requested adjustments.

2. Description of the Related Art

Much research has been going into autonomous vehicles, and the research is at the point where some auto manufacturers are currently manufacturing semi-autonomous and fully autonomous vehicles. Non-autonomous vehicles typically utilize a drive force map to determine an amount of torque to be applied to the wheels of the vehicle based on a given angle of an accelerator pedal and a current speed of the vehicle. Many autonomous vehicles accelerate using a predefined acceleration pattern because electronic control units (ECUs) of autonomous vehicles control acceleration without input from the user. However, such predefined acceleration patterns may be undesirable for a specific vehicle rider for being too slow or too fast for the preferences of the user. This lack of user control of acceleration may deter some users from purchasing or riding in autonomous vehicles, and may provide discomfort for other users.

Accordingly, there is a need in the art for a feedback system to learn and apply user preferred acceleration patterns.

SUMMARY

Described herein is a system for adjusting acceleration of a vehicle based on user preference. The system includes a memory designed to store a first base vehicle acceleration mode and a second base vehicle acceleration mode each corresponding to a different pre-selected acceleration profile of the vehicle. The system also includes a power source designed to generate mechanical power to accelerate the vehicle. The system also includes an input device designed to receive a selected base acceleration mode corresponding to a selection of the first base vehicle acceleration mode or the second base vehicle acceleration mode, and to receive a user acceleration adjustment corresponding to a desired adjustment to the selected base acceleration mode. The system also includes an electronic control unit (ECU) coupled to the memory, the power source, and the input device. The ECU is designed to control the power source to accelerate the vehicle using the selected base acceleration mode during an initial trip of the vehicle. The ECU is further designed to create a first user acceleration profile that corresponds to the desired adjustment to the selected base acceleration mode when the user acceleration adjustment is received. The ECU is further designed to control the power source to accelerate the vehicle using the first user acceleration profile during a second trip of the vehicle.

Also disclosed is a system for adjusting vehicle acceleration based on user preference. The system includes a memory designed to store a base vehicle acceleration mode corresponding to a pre-selected acceleration profile of the vehicle and including a plurality of acceleration rates including a first acceleration rate corresponding to an acceleration from a stop, a second acceleration rate corresponding to an acceleration on a highway on-ramp, a first deceleration rate corresponding to a deceleration to the stop, and a second deceleration rate corresponding to a deceleration on a highway off-ramp. The system also includes a power source designed to generate mechanical power to accelerate the vehicle. The system also includes an input device designed to receive user acceleration adjustments corresponding to a desired adjustment to each of the plurality of acceleration rates of the base vehicle acceleration mode. The system also includes an electronic control unit (ECU) coupled to the vehicle memory, the power source, and the input device. The ECU is designed to control the power source to accelerate the vehicle using the base vehicle acceleration mode during an initial trip of the vehicle. The ECU is also designed to create a first user acceleration profile that corresponds to the desired adjustment to each of the plurality of acceleration rates. The ECU is also designed to control the power source to accelerate the vehicle using the first user acceleration profile during a second trip of the vehicle.

Also disclosed is a system for adjusting acceleration of a vehicle based on driver preference. The system includes a network access device designed to receive a first pickup request from a first remote device including a current location of the first remote device, a desired destination, and a first user identifier associated with the first remote device. The system also includes a power source designed to generate mechanical power to accelerate the vehicle. The system also includes a global positioning system (GPS) unit designed to detect a current location of the vehicle. The system also includes a steering device designed to orient the vehicle in a desired direction. The system also includes an electronic control unit (ECU) coupled to the network access device, the power source, the steering device, and the GPS unit. The ECU is designed to determine a navigation route from the current location of the vehicle to the current location of the first remote device. The ECU is also designed to control the power source and the steering device to move the vehicle to the current location, of the first remote device. The ECU is also designed to control the network access device to retrieve a first user acceleration profile corresponding to desired acceleration rates that are associated with the first user identifier. The ECU is also designed to control the power source and the steering device to move the vehicle to the desired destination by controlling the power source to accelerate the vehicle using the first user acceleration profile.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for adjusting acceleration profiles of an autonomous vehicle based on user feedback. The systems provide several benefits and advantages such as providing users with an opportunity to adjust an acceleration profile of an autonomous vehicle, which may advantageously increase a comfort level of the user of the autonomous vehicle. A user may select one of multiple base acceleration modes during an initial trip of the vehicle and may provide adjustments to the selected base acceleration mode. This provides the advantage of allowing the vehicle to begin driving using acceleration rates that are more similar to the driver's preferred style such that the user adjustments may be relatively minor. The systems may also provide vehicle efficiency and use data to a server which may compile the data and advantageously create new acceleration profiles that provide improved fuel efficiency. A user acceleration profile that corresponds to the user adjustments to the base acceleration mode may be stored on a user device or in the cloud, advantageously allowing the user to export his acceleration profile to a new vehicle for use in an initial trip of the new vehicle.

An exemplary system includes a vehicle power source capable of powering the vehicle, along with a memory that includes one or more base acceleration mode and one or more user acceleration profile. The system further includes an input device that is capable of receiving a user identifier. The system also includes an electronic control unit (ECU) that may control the power source and other components of the vehicle to autonomously drive the vehicle from a starting location to a destination. The ECU may receive the user identifier from the input device and may retrieve a corresponding user acceleration profile from the memory using the user identifier. The ECU may cause the vehicle to accelerate using a selected base acceleration mode or a retrieved user acceleration profile. The input device may receive user-requested adjustments to the current acceleration profile and the ECU may create or update the user acceleration profile to include the received user requested adjustments such that the vehicle accelerates in a more appealing style to the user.

Figure 1:
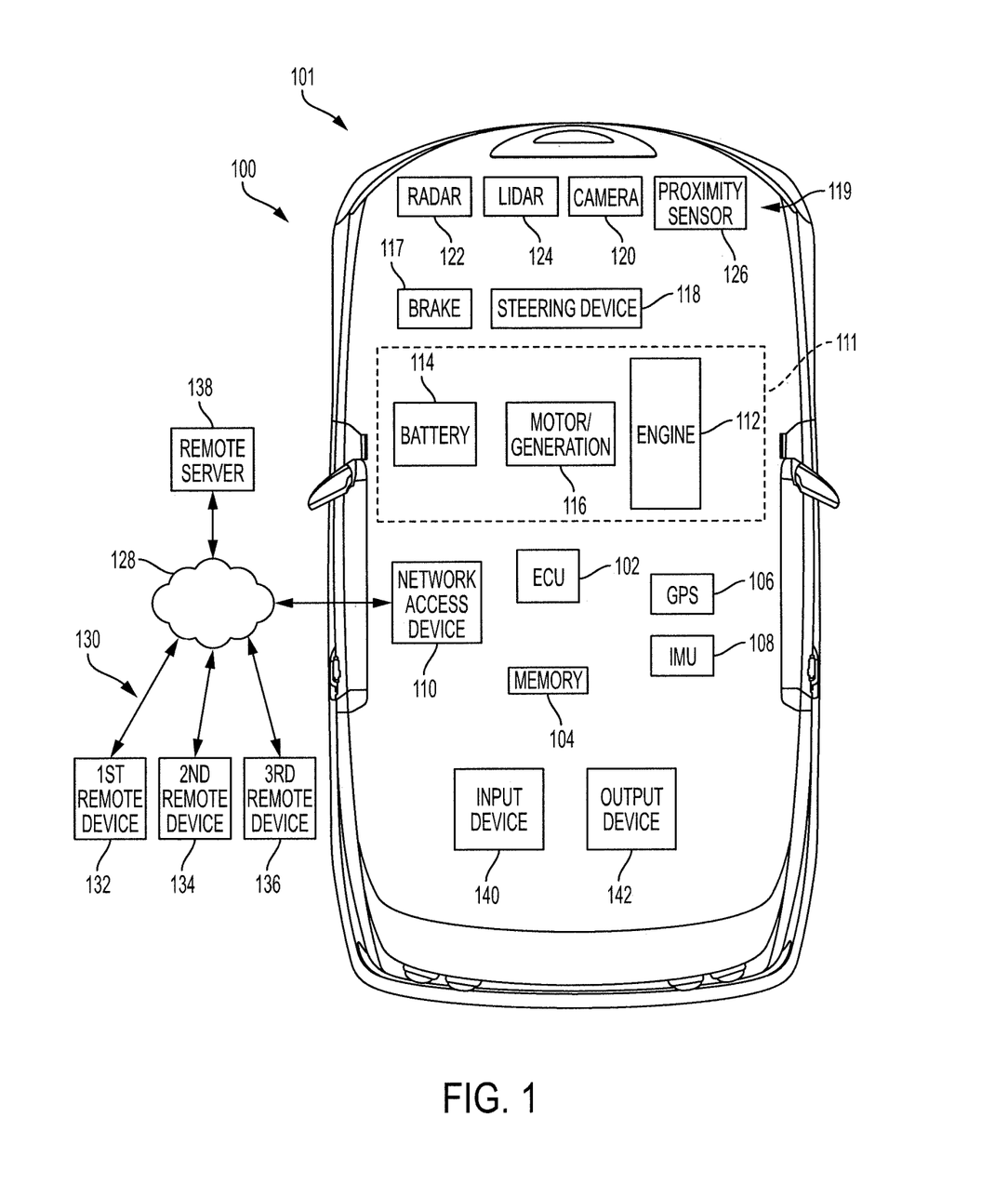
FIG. 1 is a block diagram of a vehicle having a system for adjusting acceleration of a vehicle based on user preference according to an embodiment of the present invention.

Turning to FIG. 1, a vehicle 100 includes components of a system 101 for adjusting acceleration of the vehicle 100 based on user preferences. The vehicle 100 includes an ECU 102, a memory 104, a global positioning system (GPS) sensor 106, an inertial measurement unit (IMU) sensor 108, and a network access device 110. The vehicle 100 further includes a power source 111 which may include one or more of an engine 112 or a combination of a battery 114 and motor-generator 116.

The vehicle 100 may further include a brake 117 for braking or stopping the vehicle 100, and a steering device 118 for controlling steering of the vehicle 100. The brake 117, the steering device 118, and the power source 111 may each be controlled by one or more of a user of the vehicle 100 or the ECU 102. In some embodiments, the vehicle 100 may be autonomous. In that regard, the ECU 102 may control operation of the vehicle 100 by controlling the power source 111, the brake 117, and the steering device 118.

The vehicle 100 further includes a plurality of sensors 119 including a camera 120, a radio detection and ranging (radar) sensor 122, a light imaging, detection, and ranging (LIDAR) sensor 124, and a proximity sensor 126. The sensors 119 may be capable of detecting road data corresponding to a current road condition or traffic on a current roadway. For example, the current road condition may indicate whether ice or snow is present on the roadway, whether potholes exist on the roadway, a current grade of the roadway, or the like. The traffic data may indicate the presence of traffic and a corresponding acceleration rate or speed of the traffic.

The ECU 102 may be coupled to each of the components of the vehicle 100 and may include one or more processors or controllers, which may be specifically designed for automotive systems. The functions of the ECU 102 can be implemented in a single ECU or in multiple ECUs. The ECU 102 may receive data from components of the vehicle 100, may make determinations based on the received data, and may control the operation of components based on the determinations.

The memory 104 may include any non-transitory memory known in the art. In that regard, the memory 104 may store machine-readable instructions usable by the ECU 102 and may store other data as requested by the ECU 102. The memory 104 may include a single memory located on the vehicle 100, a remote memory located away from the vehicle, a combination of a local and remote memory, or the like.

The GPS sensor 106 may be capable of detecting location data corresponding to a location of the vehicle 100. The IMU sensor 108 may detect a velocity or an orientation of the vehicle 100. One or both of the GPS sensor 106 or the IMU sensor 108 may be referred to as a location sensor and may be used to determine a current location, heading, and/or orientation of the vehicle 100. The GPS sensor 106 and the IMU sensor 108 may be used during autonomous driving to determine a current location and heading of the vehicle 100 for navigation purposes.

The network access device 110 may include any port or device capable of communicating via a wired or wireless interface such as Wi-Fi, Bluetooth, a cellular protocol, vehicle to vehicle communications, or the like. For example, the ECU 102 may control the network access device 110 to communicate with a cloud 128, an external vehicle, or one or more remote device 130 including a first remote device 132, a second remote device 134, and a third remote device 136. The network access device 110 may further communicate with a remote server 138, for example, via the cloud 128.

The engine 112 may convert a fuel into mechanical power. In that regard, the engine 112 may be a gasoline engine, a diesel engine, a fuel cell engine, or the like.

The battery 114 may store electrical energy. The motor-generator 116 may convert the electrical energy stored in the battery into mechanical power usable by the transmission 118. The motor-generator 116 may further convert mechanical power received from the transmission 118 into electrical power, which may be stored in the battery 114 as energy and/or used by other components of the vehicle 100.

Although the present discussion is related to the vehicle 100 having a hybrid power source, one skilled in the art will realize that a vehicle may include any one or combination of a gasoline or diesel engine, a fuel cell engine, a motor generator and a battery, or the like without departing from the present disclosure.

The vehicle 100 may further include an input device 140 and an output device 142. The input device 140 may include any one or more input device including a keypad, a touchscreen, a microphone, a biometric sensor, or the like. The input device 140 may be capable of receiving data from a user. In some embodiments, the network access device 110 may be referred to as an input device because data may be provided to the ECU 102 via the network access device 110. For example, a user may provide data to the ECU 102 by transmitting the data from the first remote device 132 to the ECU 102 via the network access device 110.

The output device 142 may include any output device capable of outputting data such as a display, a touchscreen, a speaker, or the like. The data output by the output device 142 may be provided in such a manner that a user of the vehicle 100 may receive the data.

Figure 2A:
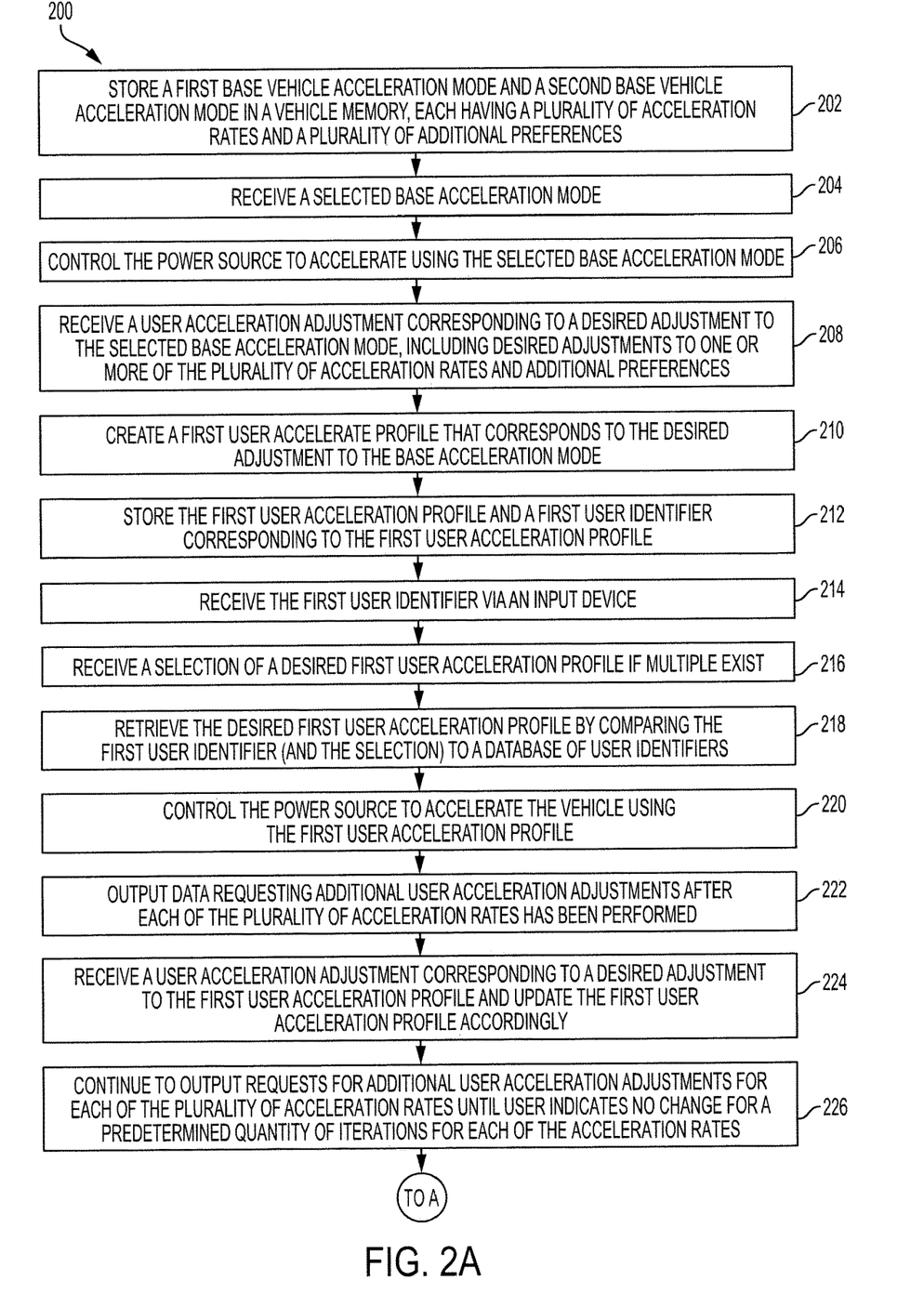
FIGS. 2A and 2B are flowcharts illustrating a method for adjusting acceleration of an autonomous vehicle based on user-received feedback according to an embodiment of the present invention.
Figure 2B:
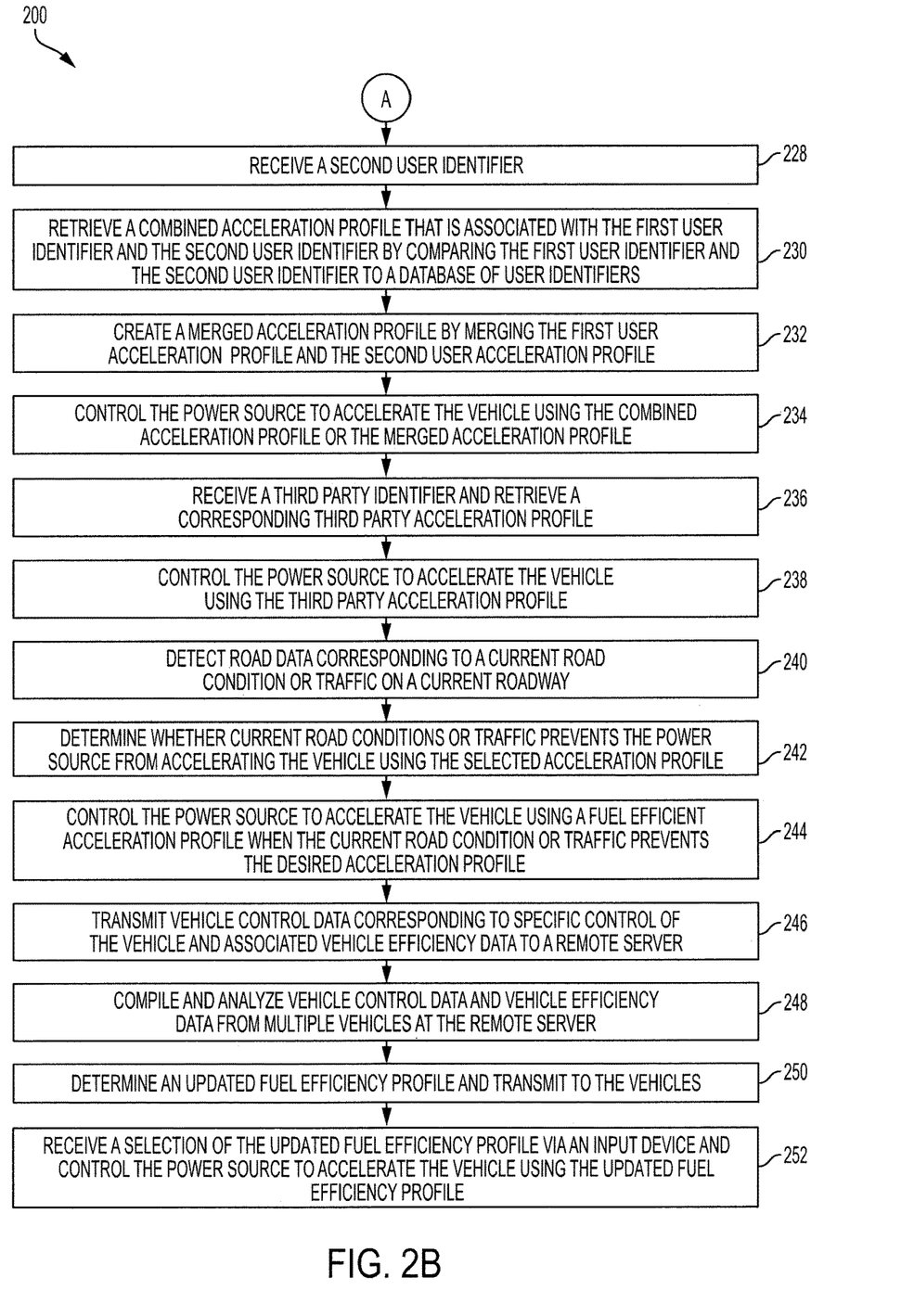

Referring now to FIGS. 2A and 2B, a method 200 for adjusting acceleration and other parameters of a vehicle, such as the vehicle 100 of FIG. 1, is shown. In block 202, one or more base vehicle acceleration mode may be stored in a memory of the vehicle. The base vehicle acceleration modes may each correspond to a different preselected acceleration profile of the vehicle. During autonomous driving, the ECU may control the power source of the vehicle to accelerate using a selected base vehicle acceleration mode.

Each of the base vehicle acceleration modes may include a plurality of acceleration rates corresponding to different driving situations as well as a plurality of additional preferences. The plurality acceleration rates may include, for example, a first acceleration rate corresponding to an acceleration from a stop, a second acceleration rate corresponding to an acceleration on a highway on-ramp, a third acceleration rate corresponding to an acceleration on the city road, a fourth acceleration rate corresponding to an acceleration on a highway, a first deceleration rate corresponding to a stop, a second deceleration rate corresponding to a deceleration on a highway off-ramp, a third deceleration rate corresponding to a deceleration on a city road, and a fourth deceleration rate corresponding to a deceleration on the highway. In some embodiments, the plurality acceleration rates may further include a mid-speed acceleration rate, a wide open throttle acceleration rate, a steady cruise to low speed acceleration rate, or the like.

Storing preference data for the plurality of acceleration rates may provide benefits over storing preference data for a single acceleration rate. For example, the user may prefer a relatively fast acceleration rate in a first situation and may prefer a relatively slow acceleration rate in a second situation. By providing the user the ability to provide acceleration preferences at such a granular level, the ECU may be capable of providing an ideal riding experience for the user across many or all situations.

The plurality of additional preferences may include, for example, a preferred speed relative to a speed limit (i.e., if the driver prefers to drive 5 miles per hour over the speed limit), a preferred ride stiffness (corresponding to a stiffness setting of a suspension of the vehicle), a preferred following distance to a leading vehicle (such as 50 yards, 100 yards, or the like), preferred audio settings (such as a preferred radio station, playlist, audio volume, or the like), preferred G-force experienced during a turn, and preferred climate control settings (such as a preferred temperature, a preferred fan speed, or the like).

For example, a first base vehicle acceleration mode may correspond to a conservative acceleration mode. The conservative acceleration mode may have relatively low acceleration rates and may mimic the driving of a relatively conservative driver. A second base acceleration mode may correspond to a fun acceleration mode. The fun acceleration mode may have relatively high acceleration rates and may mimic driving of a relatively sporty driver. A third base acceleration mode may correspond to a hospital acceleration mode. The hospital mode may have higher acceleration rates than the fun acceleration mode and may cause the vehicle to maneuver to a destination as quick as possible without endangering a passenger or other vehicles and without breaking laws. A fourth base acceleration mode may correspond to an efficiency mode. The efficiency mode may accelerate the vehicle in such a manner that is more energy-efficient than the other modes.

In block 204, the ECU may receive a selected base acceleration mode from a user vehicle. For example, a user may provide the selected base acceleration mode via an input device of the vehicle such as a keypad or touchscreen, or via an app on a remote device associated with the user. In some embodiments, the ECU may control an output device to output a list of the available base acceleration modes such that the user may select from the list. The user may select a base acceleration mode based on a preferred driving style of the user. The option to select a base acceleration mode is advantageous because the user may cause the vehicle to start driving in a manner that is more preferable to the user than if a single base acceleration mode is provided.

In block 206, the ECU may begin controlling the vehicle to drive autonomously. For example, the ECU may control the power source, the brake, and the steering device of the vehicle to maneuver along a roadway. During such control, the ECU may control the power source to accelerate using the selected base acceleration mode. For example, if the user selects a fun acceleration mode then the ECU may control the power source to accelerate more quickly than if the user selects a conservative acceleration mode.

In block 208, the ECU may receive a user acceleration adjustment via an input device. The user acceleration adjustment may correspond to a user-desired adjustment to the selected base acceleration mode. The adjustments may include, for example, adjustments to one or more of the plurality of acceleration rates and adjustments to one or more of the additional preferences. For example, the user may provide input indicating that a specific acceleration rate was too slow or too fast. In that regard, the acceleration rates may be iteratively adjusted based on multiple user-provided adjustments.

In some embodiments, the ECU may control an output device to output data requesting additional user acceleration adjustments. These requests may be output periodically during a trip, at the end of a trip, each time the power source completes an acceleration using one of the plurality of acceleration rates, or the like. For example, after the vehicle decelerates to a stop on a road, the output device may output data requesting the user to identify whether the deceleration was too fast, too slow, or just right. The user may provide their input using the input device. As another example of providing input, a user may frequently change the radio station to a specific station. The ECU may learn that the user prefers the specific station after one or more iterations of the user switching to the specific station.

In some embodiments, the user acceleration adjustments may correspond to iterative adjustments. For example, a user may request that a specific acceleration rate be increased without providing a magnitude of the increase. In some embodiments, the user acceleration adjustments may correspond to an adjustment of a user-selected magnitude. For example, the user may request that a specific acceleration rate be increased by 5 percent (5%), 10%, 25%, or the like. In some embodiments, the user may provide the user acceleration adjustments after a request is output by the output device and, in some embodiments, the user may provide the user acceleration adjustments at any point during the trip. In some embodiments, the user acceleration adjustments may correspond to a specific acceleration rate of the plurality of acceleration rates and, in some embodiments, the user acceleration adjustments may correspond to general acceleration of the vehicle.

In block 210, the ECU may create a first user acceleration profile. The first user acceleration profile may correspond to the desired adjustments to the selected base acceleration mode. For example, the ECU may create the first user acceleration profile after receiving the first user requested adjustment to the base acceleration profile. The ECU may automatically fill in the first user acceleration profile with specific acceleration rates from the base acceleration profile for acceleration rates which the user has not yet provided adjustments to.

Each time a new user acceleration adjustment is received, the ECU may again update the first user acceleration profile. In some embodiments, the ECU may store all the user acceleration adjustments received from the user during a single trip and may update the first user acceleration profile at the end of the trip.

In block 212, the ECU may store the first user acceleration profile and a first user identifier in a memory. In some embodiments, the memory may be a local memory located on the vehicle, the memory may be a remote memory accessible by a network access device, the memory may be located on a user device (such as a mobile phone), or the like.

The first user identifier may include any identifier that identifies the user associated with first user acceleration profile. For example, the first user identifier may include character string, a name, an identification number, a biometric (such as a fingerprint or iris scan), an identifying object (such as a near field communications (NFC) chip on a user device or a key fob), or the like.

The first user acceleration profile and the first user identifier be associated with each other in the memory. In that regard, when the ECU again receives the first user identifier, the ECU may retrieve the first user acceleration profile due to its association with the first user identifier.

In block 214, during a subsequent trip of the vehicle, the ECU may receive the first user identifier via an input device. For example, the user may type a name or other character string into an input device, a network access device of the vehicle may receive the user identifier via a NFC chip associated with the user, the ECU may determine the first user identifier by analyzing a key fob used to start the vehicle, or the like.

In some embodiments each user may have multiple user acceleration profiles associated with their user identifier. For example, a user may prefer one acceleration style while traveling in a first type of vehicle and may prefer another acceleration style when traveling in a second type of vehicle. As another example, the user may prefer one acceleration style while traveling by himself and may prefer another acceleration style when traveling with passengers. Each user acceleration profile associated with the user may also be stored in the memory and associated with the first user identifier.

In block 216, after the ECU has received the first user identifier, the ECU may control an output device to output data indicating the available user acceleration profiles corresponding to the first user identifier. The user may then provide a selection of a preferred user acceleration profile via the input device. In some embodiments, only one user acceleration profile may exist. In that regard, the ECU may automatically control the power source using the one user acceleration profile.

In block 218, the ECU may retrieve the desired first user acceleration profile. For example, the ECU may compare the first user identifier and the user selection of the preferred acceleration profile to a database of user identifiers. The database may include the user identifiers and the corresponding acceleration profiles. When the ECU finds a match between the first user identifier and an identifier in the database the ECU may download the corresponding first user acceleration profile.

In block 220 and during the second trip of the vehicle, the ECU may control the power source of the vehicle to accelerate using the first user acceleration profile. In that regard, during the second trip, the vehicle may accelerate in a manner that is personally suited for the first user and may be more desirable to the first user than any of the base vehicle acceleration modes.

As mentioned above and in block 222, the ECU may control the output device to output data requesting additional user acceleration adjustments. For example, the requests may be output after each acceleration rate of the plurality of acceleration rates has been performed.

In block 224, the ECU may continue to receive user acceleration adjustments corresponding to desired adjustments to the first user acceleration profile. The ECU may continue to update the first user acceleration profile as the user acceleration adjustments are received.

In block 226, the ECU may continue to output requests for additional user adjustments. In some embodiments, the ECU may cease outputting requests after a predetermined quantity of requests, a predetermined amount of time, or the like.

In some embodiments, the ECU may track how many times a user has requested an adjustment to an acceleration rate and how many times the user has indicated that the acceleration rate is acceptable. The ECU may control the output device to cease outputting the requests for additional user adjustments for a specific acceleration rate after the user has indicated that the specific acceleration rate is acceptable for a predetermined quantity of consecutive iterations. The predetermined quantity of times may correspond to a quantity at which it may be assumed that the user is likely to be satisfied with the current specific acceleration rate for multiple trips.

For example, the predetermined quantity may be equal to three. The user may provide user acceleration adjustments to a specific acceleration rate during two consecutive trips. During each of the next three trips, the user may provide an indication that the user is satisfied with the current specific acceleration rate. In that regard, during a following trip, the ECU may control the output device to no longer output the request for the additional user acceleration adjustments for the specific acceleration rate. In some embodiments, a user may provide additional input after this point requesting additional changes to the specific acceleration rate. For example, the user may provide an indication via the input device that the user prefers to change a specific acceleration rate.

Two or more users may ride in the vehicle at any given time. For example, the users may be family members or friends riding in a family vehicle or taxi vehicle, or strangers riding in a taxi vehicle. In that regard, the ECU may receive a second user identifier in block 228.

In some embodiments, particular combinations of users may together create a combined acceleration profile. The combined acceleration profile may be associated with the combination of user identifiers. When both user identifiers are detected, any user adjustments to specific acceleration rates may be saved in the combined acceleration profile.

In that regard and in block 230, the ECU may compare the combination of the first user identifier and the second user identifier to the memory and retrieve the combined acceleration profile that is associated with the first user identifier and the second user identifier.

The capability to store combined acceleration profiles provides advantages such as allowing a user or users the flexibility to have a user acceleration profile that corresponds to their preferred driving style when alone and a combined acceleration profile that corresponds to their preferred driving style when driving with a particular individual.

In some embodiments, a combined acceleration profile may not exist for a specific collection of individuals. In that regard, the ECU may retrieve the first user acceleration profile associated with the first user identifier and a second user acceleration profile associated with the second user identifier. In block 232, the ECU may merge the acceleration profiles of all users in the vehicle into a merged acceleration profile. For example, the merged acceleration profile may include an average acceleration rate for each of the plurality of acceleration rates of the vehicle.

In block 234 and after retrieving the combined acceleration profile or creating the merged acceleration profile, the ECU may control the power source to accelerate the vehicle using the combined acceleration profile or the merged acceleration profile.

In some embodiments, additional acceleration profiles may be available in the memory or may be downloadable via the network access device. For example, the additional acceleration profiles may correspond to acceleration profiles of famous or well-known individuals such as Akio Toyoda or Dale Earnhardt Jr. As another example, the additional acceleration profiles may correspond to specific vehicle types such as a Ferrari acceleration profile, a Prius acceleration profile, or the like. Each of these additional acceleration profiles may be referred to as a third-party acceleration profile and may have a corresponding third-party identifier.

In some embodiments, each user may upload or provide their specific acceleration profile to a community database for other users to retrieve. In that regard, a user may select a specific acceleration profile of another user. In some embodiments, users may provide comments along with their specific acceleration profile such as whether use of the profile achieves greater fuel efficiency, improves time to a destination, or the like such that other users may determine whether they would like to utilize the specific acceleration profile and achieve the enumerated benefits.

In block 236, the ECU may receive a third-party identifier via the input device. For example, a user may type the third-party identifier using a touchscreen or keypad. The ECU may access the memory and retrieve the corresponding third-party acceleration profile by comparing the third-party identifier to the entries in the memory.

In block 238, the ECU may control the power source to accelerate the vehicle using the retrieved third-party acceleration profile. In some embodiments, the user may provide user acceleration adjustments regarding the third party acceleration profile and the ECU may store the adjusted profile as a user acceleration profile.

In some embodiments, a current road or traffic condition may cause a selected user acceleration profile to be dangerous or not possible to implement. In that regard, the ECU may implement another acceleration profile.

In particular and in block 240, one or more sensor of the vehicle may detect road data that corresponds to a current road condition or traffic on a current roadway. For example, a camera, radar sensor, LIDAR sensor, or other proximity sensor may detect road data such as current traffic, the presence of ice, snow, or other moisture on a roadway, the presence of potholes on a roadway, or the like.

In block 242, the ECU may determine whether the current road condition or current traffic prevents the power source from accelerating the vehicle using the selected acceleration profile. The ECU may also determine whether the current road condition or current traffic may increase a risk of harm if the selected acceleration profile is implemented. For example, if the acceleration profile indicates a request to accelerate at 10 meters per second squared ($m/s^2$) but such acceleration is likely to cause a collision, then the ECU may determine that the selected acceleration profile should not be utilized.

In that regard and in block 244, the ECU may select another acceleration profile to use that may be safer for the current road condition or traffic. In this situation and in some embodiments, the ECU may select a fuel efficient acceleration profile due to the relatively limited possible acceleration. For example, the ECU may select the most fuel-efficient acceleration profile in situations in which vehicle acceleration is limited.

In some embodiments, vehicles utilizing the method 200 may be capable of transmitting vehicle control data and associated vehicle efficiency data to a remote server. In that regard and in block 246, the ECU may transmit vehicle control data corresponding to specific control of the vehicle and associated vehicle efficiency data to a remote server. The vehicle control data may include any controls of the vehicle that may affect vehicle efficiency. For example, the vehicle control data may include an open percentage of grill flaps, acceleration rates of the vehicle, a ratio of power requested from a motor generator to power requested from an engine, a gear ratio for a given roadway speed and slope, or the like. The vehicle efficiency data may include efficiency metrics of the vehicle for the given vehicle control data such as fuel efficiency, motor-generator efficiency, or the like.

For example, the vehicle may travel along a roadway segment with the grill flaps at 20% open and the vehicle efficiency data may indicate 60% efficiency. The vehicle may later travel along the same roadway segment with the grill flaps at 10% open and the vehicle efficiency data may indicate 70% efficiency. This indicates that the vehicle may operate more efficiently on similar roadways if the grill flaps are 10% open instead of 20% open.

In some embodiments, the server may also or instead receive user adjustments to each acceleration rate of the vehicle acceleration mode from multiple vehicles.

In block 248, the remote server may compile and analyze the vehicle control data and vehicle efficiency data received from each of the remote vehicles. For example, the vehicle control data vehicle efficiency data may be analyzed to determine which settings provide the greatest fuel efficiency in particular situations. In some embodiments, the remote server may analyze this data to determine ideal settings for achieving alternate goals such as fastest acceleration rates or least amount of fuel burned in a hybrid vehicle.

Based on the analysis and in block 250, the remote server may determine or create an updated fuel efficiency profile (fastest acceleration profile, leased fuel burn profile, or the like). Creating updated fuel efficiency profiles in this manner may be advantageous because a specific set of vehicle controls may provide unexpected benefits. Continuing the grill flap example above, it may be unexpected for the grill flap open percentage of 10% to provide such an increase in vehicle efficiency.

In some embodiments where the remote server receives the user adjustments to each acceleration rate of the base vehicle acceleration modes, the remote server may further analyze the data to determine trends regarding adjustments to the base vehicle acceleration modes. If the trends suggest that a majority of drivers prefer a specific adjustment to a specific base vehicle acceleration mode then the remote server may replace the specific base vehicle acceleration mode with a new base vehicle acceleration mode that includes the specific adjustment.

In block 252, the updated fuel efficiency profile may be available for access by the specific vehicles. For example, the remote server may upload the updated fuel efficiency profile to each of the vehicles such that a user may select the updated fuel efficiency profile from a list of available acceleration profiles. In response to a user selecting the updated fuel efficiency profile, the ECU may control the power source to accelerate the vehicle using the updated fuel efficiency profile.

Figure 3:
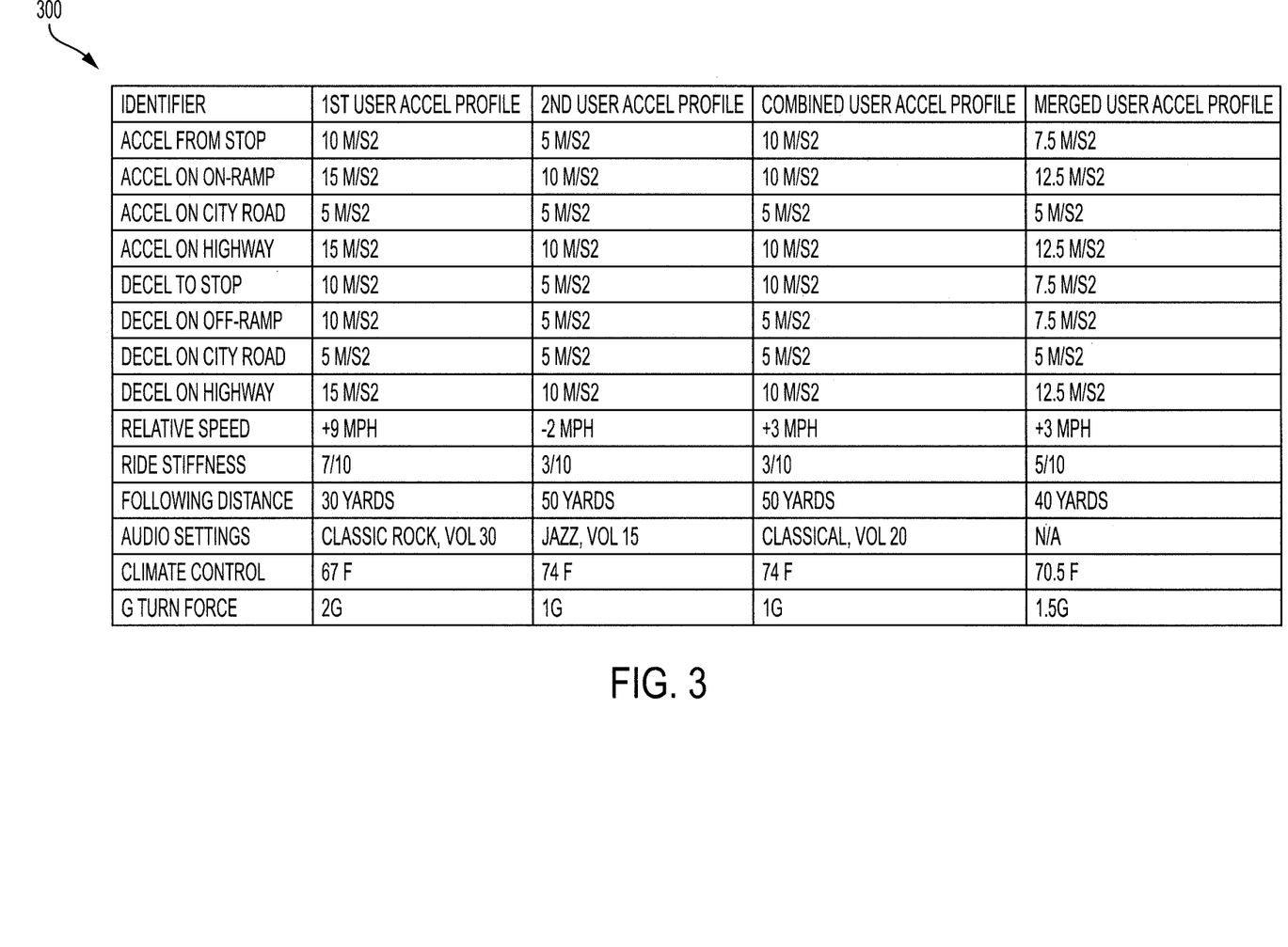
FIG. 3 is a chart illustrating an exemplary database of user identifiers and corresponding acceleration profiles according to an embodiment of the present invention.

Referring now to FIG. 3, an exemplary identifier database 300 may include information for two user identifiers, a combined acceleration profile, and a merged user acceleration profile. As shown, each of the users may have specific desirable acceleration rates for each of the plurality of acceleration rates, and may also have specific desirable settings for the plurality of additional preferences. As shown, the desirable acceleration rates and settings may be the same or different between the first user acceleration profile and the second user acceleration profile.

The combined user acceleration profile may have settings that do not specifically correspond to the first user acceleration profile or the second user acceleration profile. Also, the merged user acceleration profile may include specific acceleration rates that correspond to an average of the first user acceleration profile and the second user acceleration profile.

Some settings of the database 300 may not be mergeable. For example, the audio settings of the first user acceleration profile and the second user acceleration profile may not be mergeable. In that regard, the ECU may select the audio settings of the first user acceleration profile or the second user acceleration profile, or may not select audio settings at all.

Figure 4A:
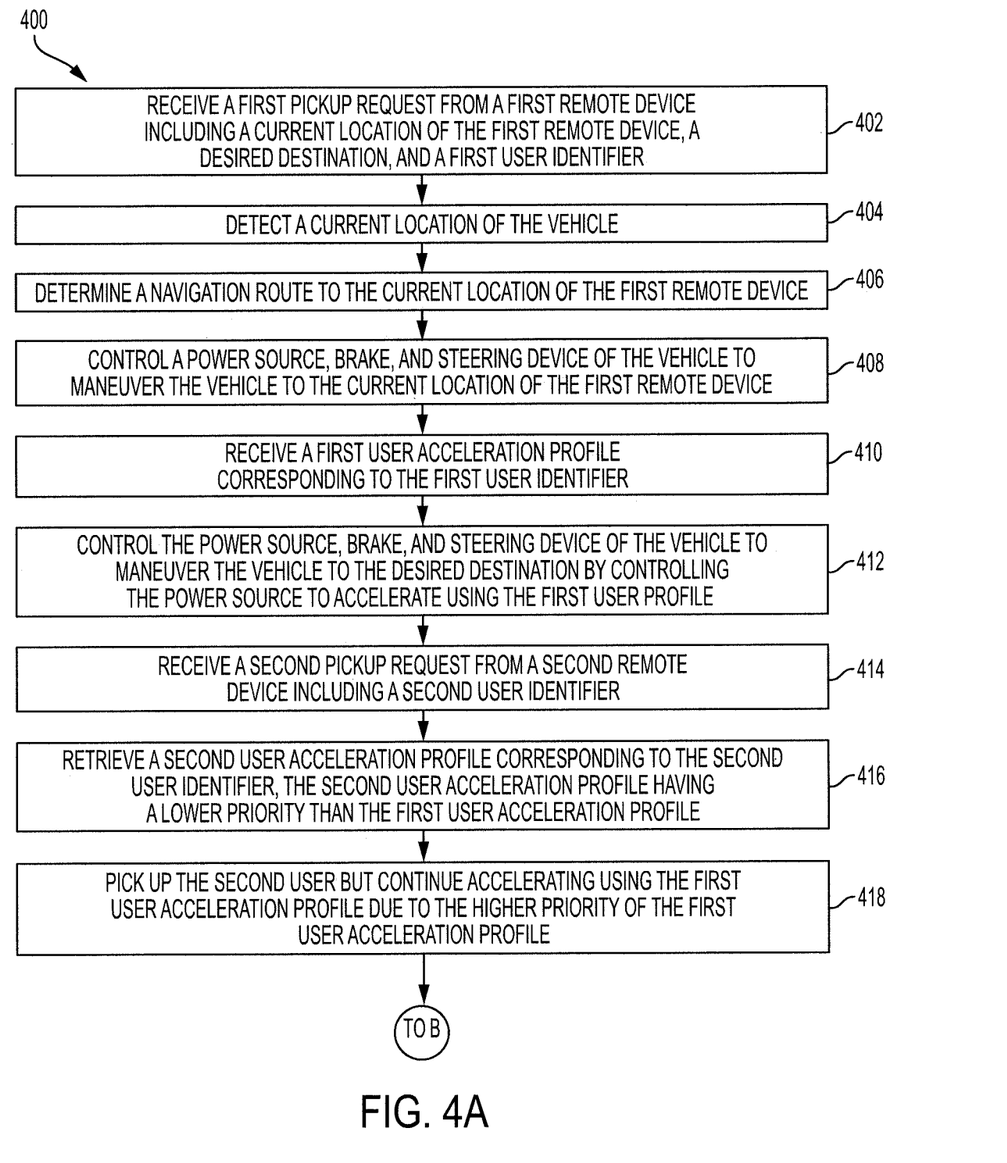
FIGS. 4A and 4B are flowcharts illustrating a method for adjusting acceleration of an autonomous taxi vehicle based on preferences of the riders according to an embodiment of the present invention.
Figure 4B:
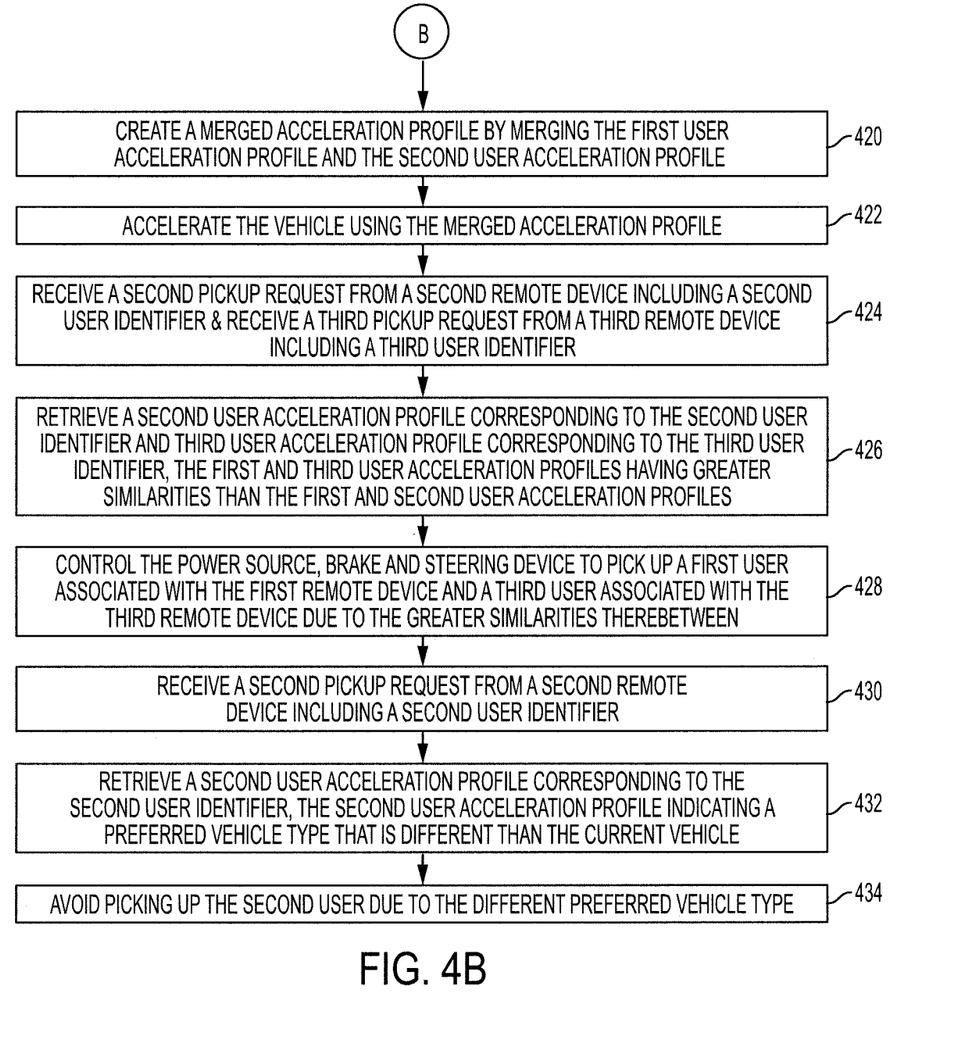

Referring now to FIGS. 4A and 4B, a method 400 for adjusting acceleration and other parameters of a vehicle, such as the vehicle 100 of FIG. 1, is shown. In some embodiments, the method 400 may be utilized by a vehicle operating as an auto taxi. For example, the vehicle may be autonomously controlled to pick up a rider and travel to a desired destination using the preferred acceleration profile of the rider.

In block 402, an ECU of the vehicle may receive a first pickup request from a first remote device via a network access device. For example, the first remote device may be a smart phone of a user such that the user may request a pickup using an app installed on the smart phone. The first pickup request may include a current location of the first remote device, a desired destination of the first user, and a first user identifier used to identify the first user. In some embodiments, the first user identifier may be associated with the app such that the first user identifier is always transmitted with pickup requests from the first remote device. In some embodiments, the first remote device may detect the current location of the first remote device using a sensor such as a GPS sensor.

In block 404, the vehicle may detect a current location of the vehicle. For example, the ECU may analyze data received from one or more of a GPS sensor or an IMU sensor. Based on the received data, the ECU may determine the current location of the vehicle.

In block 406, the ECU may determine a navigation route from the current location of the vehicle to the current location of the first remote device. Such navigation planning is well known in the art.

In block 408, the ECU may control the vehicle to travel to the current location of the first remote device following the navigation route determined in block 406. For example, the ECU may control the power source, the brake, and the steering device of the vehicle to maneuver the vehicle to the current location of the first remote device.

In some embodiments, the first pickup request may include an indication of whether the first user is in a rush or not. If the user indicates that he is not in a rush then the ECU may control the power source of the vehicle to accelerate using a relatively fuel efficient acceleration profile. This feature beneficially results in fuel savings for the owner or operator of the vehicle. If the user indicates that he is in a rush then the ECU may control the power source of the vehicle to accelerate using a relatively fast acceleration rate, such as a sport acceleration profile or a fun acceleration profile.

In some embodiments, the ECU may determine whether the first user acceleration profile will be quicker than a more efficient acceleration profile. If the time to the destination using the first user acceleration profile and the more efficient acceleration profile is relatively equal then the ECU may determine to accelerate using the more efficient acceleration profile in order to achieve energy savings.

In some embodiments, each user may be assigned a certain quantity of priority points. Such points may be used, for example, to provide priority pickup to a user with a relatively great quantity of priority points (i.e., during a busy time a priority user may be picked up before a nonpriority user). Such points may also be used, for example, to determine which user acceleration profile to use if multiple users are traveling together. Such points may also be used to provide ride discounts or the like.

In some embodiments, when a user indicates that he is not in a rush, the priority points of the user may be increased because the vehicle can travel in a more fuel efficient manner.

In block 410, the ECU may receive a first user acceleration profile that corresponds to the first user identifier. In some embodiments, the first user acceleration profile may be included with the pickup request from the first remote device. In some embodiments, the first user acceleration profile may be stored in a local or remote memory such that the ECU may retrieve the first user acceleration profile using the first user identifier.

In block 412, the ECU may determine a navigation route from the current location to the desired destination of the user and may control the vehicle to maneuver to the desired destination. Because the ECU has retrieved the first user acceleration profile, the ECU may control the vehicle to travel to the desired destination using the first user acceleration profile.

In some embodiments if users are assigned priority points, the first user may be assigned priority points based on the fuel efficiency of the first user acceleration profile. For example, if the first user acceleration profile is relatively efficient then the first user may be assigned more priority points than if the first user acceleration profile is relatively inefficient.

In some embodiments, the vehicle may be designed to provide ride sharing capabilities such that more than one unrelated user may be transported at any given time. Such ridesharing may reduce the cost for each user of the vehicle. In that regard, a user profile may include an indicator of whether the user prefers to rideshare or prefers to ride in his own vehicle. In some embodiments, a user may be provided with additional priority points if the user opts to rideshare with one or more additional user.

In block 414, the ECU of the vehicle may receive a second pickup request from a second remote device that includes a second user identifier. The second pickup request may be received before the first user is picked up or after the first user has been picked up.

In block 416, the ECU may retrieve a second user acceleration profile that corresponds to the second user identifier. For example, the second user may be assigned a lower priority than the first user. In that regard and in block 418, the ECU may pick up the second user in addition to the first user. Users with a higher priority (i.e., more priority points) may be provided benefits such as the ECU controlling the vehicle using the acceleration profile of the higher priority user. In that regard, the ECU may accelerate the vehicle using the first user acceleration profile because the first user acceleration profile has a higher profile than the second user.

In some embodiments, a user may purchase priority points or higher priority status level for a single ride or for his profile in general. In that regard, if a user desires to have his acceleration profile utilized by the ECU then the user may pay an additional sum of money to ensure that his acceleration profile will be used during his ride. In some embodiments, a bidding process may be available such that users may bid for the highest priority for a specific trip.

In some embodiments, user priority for a specific trip may be set by the first user in the vehicle such that the acceleration profile of the first user in the vehicle will be applied for the specific trip. In some embodiments, user priority for a specific trip may be set by the user having the longest trip in the vehicle such that the acceleration profile of the user who will be riding the longest will be utilized during the specific trip. In some embodiments, user priority for a specific trip may be set by the user who is the most frequent rider or user of the service, or the user who has traveled the most miles with the service.

In some embodiments, a user may be provided with a first class environment if the user has a relatively high profile or pays an additional sum of money for a given trip. The first class environment may include a more luxurious seat in the vehicle, the ECU controlling the vehicle using the specific user acceleration profile of the first class rider (including the additional preferences such as audio preferences and climate control preferences), certain alcoholic or nonalcoholic beverages available for free for the first class rider, or the like.

In block 420, the ECU may create a merged acceleration profile by merging the first user acceleration profile and the second user acceleration profile if priority points are not used or the priority of the users is relatively equal. The merged acceleration profile may be created in a similar manner as in block 232 of FIG. 2A. In block 422, the ECU may cause the vehicle to accelerate using the merged acceleration profile while both the first user and the second user are traveling in the vehicle. In some embodiments, after one user exits the vehicle, the ECU may control the vehicle using the acceleration profile of the remaining user.

The vehicle may occasionally receive a pickup request from more than two users. In that regard and in block 424, the ECU may receive a second pickup request from a second remote device and a third pickup request from a third remote device after receiving the first pickup request. The second pickup request may include a second user identifier and the third pickup request may include a third user identifier.

In block 426, the ECU may retrieve a second user acceleration profile and a third user acceleration profile using the second user identifier and the third identifier. For example, the first user acceleration profile and the third user acceleration profile may have greater similarities than the first user acceleration profile and the second user acceleration profile. For example the difference in acceleration rates between the first user acceleration profile and the third user acceleration profile may be less than the difference in acceleration rates between the first user acceleration profile and the second user acceleration profile. In that regard, it may be desirable for the first user and the third user to ride together and for the second user to ride in a different vehicle.

In block 428, the ECU may control the vehicle to pick up the first user and the third user and to deny the pickup request from the second user. This may be beneficial as each user of the rideshare program may be provided with the ability to ride in a vehicle that uses a relatively desirable acceleration profile for the given user.

In block 430, the ECU may receive a second pickup request for a second remote device after receiving the first pickup request from the first remote device. In block 432, the ECU may retrieve a second user acceleration profile that corresponds to the second user identifier. For example, the second user acceleration profile may indicate a preference of a specific vehicle. For example, the second user acceleration profile may indicate a preference for a Toyota 4 Runner and the present vehicle may be a Toyota Prius. In that regard, it may be desirable to provide the second user with a ride using a Toyota 4 Runner.

In some embodiments, the ECU may determine whether the current vehicle is capable of accelerating using a specific user acceleration profile. If the ECU is incapable of accelerating using the specific user acceleration profile then the ECU may attempt to find another vehicle that is capable of accelerating using the specific user acceleration profile and may request for that vehicle to pick up the specific user.

In block 434, the ECU may avoid picking up the second user due to the different preferred vehicle type. In some embodiments, before denying the second pickup request, the ECU may ensure that a Toyota 4 Runner is available to pick up the second user within a reasonable amount of time. The reasonable amount of time may be determined by the second user. For example, if the second user indicates that he is in a rush then the reasonable amount of time may be relatively small, while the reasonable amount of time may be relatively large if the second user indicates that he is not in a rush.

If a Toyota 4 Runner is not available to pick of the second user within a reasonable amount of time then the ECU may determine if a vehicle similar to the Toyota 4 Runner is available to pick up the second user. If so, the ECU may request that the similar vehicle pick up the second user. Otherwise, the ECU may proceed to pick up the second user.

In some embodiments, the ECU may transmit a message to the remote device indicating that the vehicle is available but is not the preferred vehicle type, and requesting feedback from the second user. The ECU may also transmit a message indicating an amount of wait time for the user preferred vehicle type. The second user may at that point indicate whether he prefers to wait for the Toyota 4 Runner or a similar vehicle, or whether he prefers to ride in the current vehicle without waiting for the Toyota 4 Runner.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for adjusting acceleration of a vehicle based on user preference, the system comprising:
    a memory configured to store data including a first base vehicle acceleration mode and a second base vehicle acceleration mode each corresponding to a different pre-selected acceleration profile of the vehicle;
    a power source configured to generate mechanical power to accelerate the vehicle;
    an input device configured to receive:
        a selected base acceleration mode corresponding to a selection of the first base vehicle acceleration mode or the second base vehicle acceleration mode,
        a user acceleration adjustment corresponding to a desired adjustment to the selected base acceleration mode, and
        a first user identifier corresponding to a first user and a second user identifier corresponding to a second user; and
    an electronic control unit (ECU) coupled to the memory, the power source, and the input device, and configured to:
        control the power source to accelerate the vehicle using the selected base acceleration mode during an initial trip of the vehicle,
        create a first user acceleration profile that corresponds to the desired adjustment to the selected base acceleration mode when the user acceleration adjustment is received,
        compare the first user identifier and the second user identifier to the data stored in the memory during preparation for a third trip of the vehicle,
        receive a combined acceleration profile that is associated with the first user identifier and the second user identifier from the memory,
        control the power source to accelerate the vehicle using the first user acceleration profile during a second trip of the vehicle, and
        control the power source to accelerate the vehicle using the combined acceleration profile during the third trip of the vehicle.

2. The system of claim 1 wherein the ECU is further configured to:
    compare the first user identifier and the second user identifier to the data stored in the memory during preparation for a fourth trip of the vehicle;
    receive the first user acceleration profile corresponding to the first user identifier and a second user acceleration profile corresponding to the second user identifier from the memory;
    create a merged acceleration profile by merging the first user acceleration profile and the second user acceleration profile; and
    control the power source to accelerate the vehicle using the merged acceleration profile during the fourth trip of the vehicle.

3. The system of claim 1 wherein the first base vehicle acceleration mode is a conservative acceleration mode corresponding to first desired acceleration rates, and the second base vehicle acceleration mode is a fun acceleration mode corresponding to second desired acceleration rates that are greater than the first desired acceleration rates.

4. The system of claim 1 further comprising a network access device configured to access a plurality of third party acceleration profiles each corresponding to a different person and stored in the memory, wherein:
    the input device is further configured to receive a third party identifier corresponding to a desired third party acceleration profile, and
    the ECU is further configured to control the power source to accelerate the vehicle using the desired third party acceleration profile during a fourth trip of the vehicle based on the received third party identifier.

5. The system of claim 1 further comprising a road data sensor configured to detect road data corresponding to a current road condition or traffic on a current roadway of the second trip, wherein the ECU is further configured to:
    determine that the detected road data indicates that the current road condition or the traffic prevents the power source from accelerating the vehicle using the first user acceleration profile on the current roadway; and
    control the power source to accelerate the vehicle using whichever of the first base vehicle acceleration mode or the second base vehicle acceleration mode is more fuel efficient when the current road condition or the traffic prevents the power source from accelerating the vehicle using the first user acceleration profile.

6. The system of claim 1 further comprising a network access device configured to:
    transmit vehicle control data corresponding to specific control of the power source and transmit associated vehicle efficiency data corresponding to efficiency of the power source to a remote server; and
    receive an updated fuel efficiency acceleration mode corresponding to a fuel-efficient acceleration profile of the vehicle from the remote server that was created by the remote server based on the vehicle control data and the associated vehicle efficiency data, wherein:
        the input device is further configured to receive a selection of the updated fuel efficiency acceleration mode, and
        the ECU is further configured to control the power source to accelerate the vehicle using the updated fuel efficiency acceleration mode during a third trip of the vehicle based on the received selection of the updated fuel efficiency acceleration mode.

7. The system of claim 1 wherein:
the input device is further configured to receive a selection of the first user acceleration profile or a third user acceleration profile corresponding to a second user profile of a same user as the first user acceleration profile; and
the ECU is further configured to control the power source to accelerate the vehicle using whichever of the first user acceleration profile or the second user acceleration profile is selected during a fourth trip of the vehicle.

8. A system for adjusting acceleration of a vehicle based on user preference, the system comprising:
a memory configured to store data including a first base vehicle acceleration mode and a second base vehicle acceleration mode each corresponding to a different pre-selected acceleration profile of the vehicle;
a power source configured to generate mechanical power to accelerate the vehicle;
an input device configured to receive:
a selected base acceleration mode corresponding to a selection of the first base vehicle acceleration mode or the second base vehicle acceleration mode,
a user acceleration adjustment corresponding to a desired adjustment to the selected base acceleration mode, and
a first user identifier corresponding to a first user and a second user identifier corresponding to a second user; and
an electronic control unit (ECU) coupled to the memory, the power source, and the input device, and configured to:
control the power source to accelerate the vehicle using the selected base acceleration mode during an initial trip of the vehicle,
create a first user acceleration profile that corresponds to the desired adjustment to the selected base acceleration mode when the user acceleration adjustment is received,
compare the first user identifier and the second user identifier to the data stored in the memory during preparation for a third trip of the vehicle,
receive the first user acceleration profile corresponding to the first user identifier and a second user acceleration profile corresponding to the second user identifier from the memory,
create a merged acceleration profile by merging the first user acceleration profile and the second user acceleration profile,
control the power source to accelerate the vehicle using the first user acceleration profile during a second trip of the vehicle, and
control the power source to accelerate the vehicle using the merged acceleration profile during the third trip of the vehicle.

9. The system of claim 8 wherein the ECU is further configured to:
compare the first user identifier and the second user identifier to the data stored in the memory during preparation for a fourth trip of the vehicle;
receive a combined acceleration profile that is associated with the first user identifier and the second user identifier from the memory; and
control the power source to accelerate the vehicle using the combined acceleration profile during the fourth trip of the vehicle.

10. The system of claim 8 wherein the first base vehicle acceleration mode is a conservative acceleration mode corresponding to first desired acceleration rates, and the second base vehicle acceleration mode is a fun acceleration mode corresponding to second desired acceleration rates that are greater than the first desired acceleration rates.

11. The system of claim 8 further comprising a network access device configured to access a plurality of third party acceleration profiles each corresponding to a different person and stored in the memory, wherein:
the input device is further configured to receive a third party identifier corresponding to a desired third party acceleration profile, and
the ECU is further configured to control the power source to accelerate the vehicle using the desired third party acceleration profile during a fourth trip of the vehicle based on the received third party identifier.

12. The system of claim 1 further comprising a road data sensor configured to detect road data corresponding to a current road condition or traffic on a current roadway of the second trip, wherein the ECU is further configured to:
determine that the detected road data indicates that the current road condition or the traffic prevents the power source from accelerating the vehicle using the first user acceleration profile on the current roadway; and
control the power source to accelerate the vehicle using whichever of the first base vehicle acceleration mode or the second base vehicle acceleration mode is more fuel efficient when the current road condition or the traffic prevents the power source from accelerating the vehicle using the first user acceleration profile.

13. The system of claim 8 further comprising a network access device configured to:
transmit vehicle control data corresponding to specific control of the power source and transmit associated vehicle efficiency data corresponding to efficiency of the power source to a remote server; and
receive an updated fuel efficiency acceleration mode corresponding to a fuel-efficient acceleration profile of the vehicle from the remote server that was created by the remote server based on the vehicle control data and the associated vehicle efficiency data, wherein:
the input device is further configured to receive a selection of the updated fuel efficiency acceleration mode, and
the ECU is further configured to control the power source to accelerate the vehicle using the updated fuel efficiency acceleration mode during a fourth trip of the vehicle based on the received selection of the updated fuel efficiency acceleration mode.

14. The system of claim 8 wherein:
the input device is further configured to receive a selection of the first user acceleration profile or a third user acceleration profile corresponding to a second user profile of a same user as the first user acceleration profile; and
the ECU is further configured to control the power source to accelerate the vehicle using whichever of the first user acceleration profile or the second user acceleration profile is selected during a fourth trip of the vehicle.

15. A method for adjusting acceleration of a vehicle based on user preference, the method comprising:
storing, in a memory, data including a first base vehicle acceleration mode and a second base vehicle acceleration mode each corresponding to a different pre-selected acceleration profile of the vehicle;

receiving, by an input device, a selected base acceleration mode corresponding to a selection of the first base vehicle acceleration mode or the second base vehicle acceleration mode;

receiving, by the input device, a user acceleration adjustment corresponding to a desired adjustment to the selected base acceleration mode;

receiving, by the input device, a first user identifier corresponding to a first user and a second user identifier corresponding to a second user;

controlling, by an electronic control unit (ECU), a power source to accelerate the vehicle using the selected base acceleration mode during an initial trip of the vehicle;

creating, by the ECU, a first user acceleration profile that corresponds to the desired adjustment to the selected base acceleration mode when the user acceleration adjustment is received;

comparing, by the ECU, the first user identifier and the second user identifier to the data stored in the memory during preparation for a third trip of the vehicle;

receiving, by the ECU, a combined acceleration profile that is associated with the first user identifier and the second user identifier from the memory;

controlling, by the ECU, the power source to accelerate the vehicle using the first user acceleration profile during a second trip of the vehicle; and controlling, by the ECU, the power source to accelerate the vehicle using the combined acceleration profile during the third trip of the vehicle.

16. The method of claim 15 further comprising:
comparing, by the ECU, the first user identifier and the second user identifier to the data stored in the memory during preparation for a fourth trip of the vehicle;

receiving, by the ECU, the first user acceleration profile corresponding to the first user identifier and a second user acceleration profile corresponding to the second user identifier from the memory;

creating, by the ECU, a merged acceleration profile by merging the first user acceleration profile and the second user acceleration profile; and controlling, by the ECU, the power source to accelerate the vehicle using the merged acceleration profile during the fourth trip of the vehicle.

17. The method of claim 15 wherein the first base vehicle acceleration mode is a conservative acceleration mode corresponding to first desired acceleration rates, and the second base vehicle acceleration mode is a fun acceleration mode corresponding to second desired acceleration rates that are greater than the first desired acceleration rates.

18. The method of claim 15 further comprising:
accessing, by a network access device, a plurality of third party acceleration profiles each corresponding to a different person and stored in the memory;

receiving, by the input device; a third party identifier corresponding to a desired third party acceleration profile; and controlling, by the ECU, the power source to accelerate the vehicle using the desired third party acceleration profile during a fourth trip of the vehicle based on the received third party identifier.

19. The method of claim 15 further comprising:
detecting, by a road data sensor, road data corresponding to a current road condition or traffic on a current roadway of the second trip;

determining, by the ECU, that the detected road data indicates that the current road condition or the traffic prevents the power source from accelerating the vehicle using the first user acceleration profile on the current roadway; and controlling, by the ECU, the power source to accelerate the vehicle using whichever of the first base vehicle acceleration mode or the second base vehicle acceleration mode is more fuel efficient when the current road condition or the traffic prevents the power source from accelerating the vehicle using the first user acceleration profile.

20. The method of claim 15 further comprising:
transmitting, by a network access device, vehicle control data corresponding to specific control of the power source and transmit associated vehicle efficiency data corresponding to efficiency of the power source to a remote server;

receiving, by the network access device, an updated fuel efficiency acceleration mode corresponding to a fuel-efficient acceleration profile of the vehicle from the remote server that was created by the remote server based on the vehicle control data and the associated vehicle efficiency data;

receiving, by the input device, a selection of the updated fuel efficiency acceleration mode; and controlling, by the ECU, the power source to accelerate the vehicle using the updated fitel efficiency acceleration mode during a third trip of the vehicle based on the received selection of the updated fuel efficiency acceleration mode.

* * * * *